(12) United States Patent
Oyachi

(10) Patent No.: US 11,736,820 B2
(45) Date of Patent: Aug. 22, 2023

(54) IMAGE CAPTURE APPARATUS AND CONTROL METHOD FOR RAW IMAGES

(71) Applicant: CANON KABUSHIKI KAISHA, Tokyo (JP)

(72) Inventor: Takahiko Oyachi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/832,367

(22) Filed: Jun. 3, 2022

(65) Prior Publication Data

US 2022/0394177 A1 Dec. 8, 2022

(30) Foreign Application Priority Data

Jun. 7, 2021 (JP) ................................. 2021-095271

(51) Int. Cl.
*H04N 23/951* (2023.01)
*H04N 5/262* (2006.01)

(52) U.S. Cl.
CPC ......... *H04N 23/951* (2023.01); *H04N 5/2625* (2013.01)

(58) Field of Classification Search
CPC .... H04N 23/951; H04N 5/2625; H04N 23/60; H04N 23/62; H04N 23/663; H04N 23/661; H04N 23/80
See application file for complete search history.

(56) References Cited

U.S. PATENT DOCUMENTS

| | | | | |
|---|---|---|---|---|
| 7,619,661 B2* | 11/2009 | Takahashi | ............ | H04N 23/663 |
| | | | | 348/222.1 |
| 2011/0234807 A1* | 9/2011 | Jones | .................... | H04N 23/698 |
| | | | | 348/E7.085 |
| 2014/0320689 A1* | 10/2014 | Ohba | ..................... | H04N 23/80 |
| | | | | 348/222.1 |
| 2021/0264638 A1* | 8/2021 | Satoh | .................... | H04N 23/661 |
| 2022/0060653 A1* | 2/2022 | Yoshida | ................. | H04N 23/80 |

FOREIGN PATENT DOCUMENTS

JP 2006197566 A 7/2006

* cited by examiner

*Primary Examiner* — Hung H Lam
(74) *Attorney, Agent, or Firm* — Canon U.S.A., Inc.

(57) ABSTRACT

An image capture apparatus that communicates with an image processing apparatus, transmits a plurality of RAW images acquired by continuous shooting by an image capturing unit to the image processing apparatus, receives an image in which a predetermined RAW image is developed or an extracted result of the predetermined RAW image from the image processing apparatus which extracts the predetermined RAW image that satisfies a predetermined condition from the plurality of RAW images received from the image capture apparatus, and, when a predetermined representative image among the plurality of RAW images acquired by the image capturing unit and a predetermined RAW image extracted by the image processing apparatus are different, determines whether to replace the predetermined representative image with the predetermined RAW image.

9 Claims, 10 Drawing Sheets

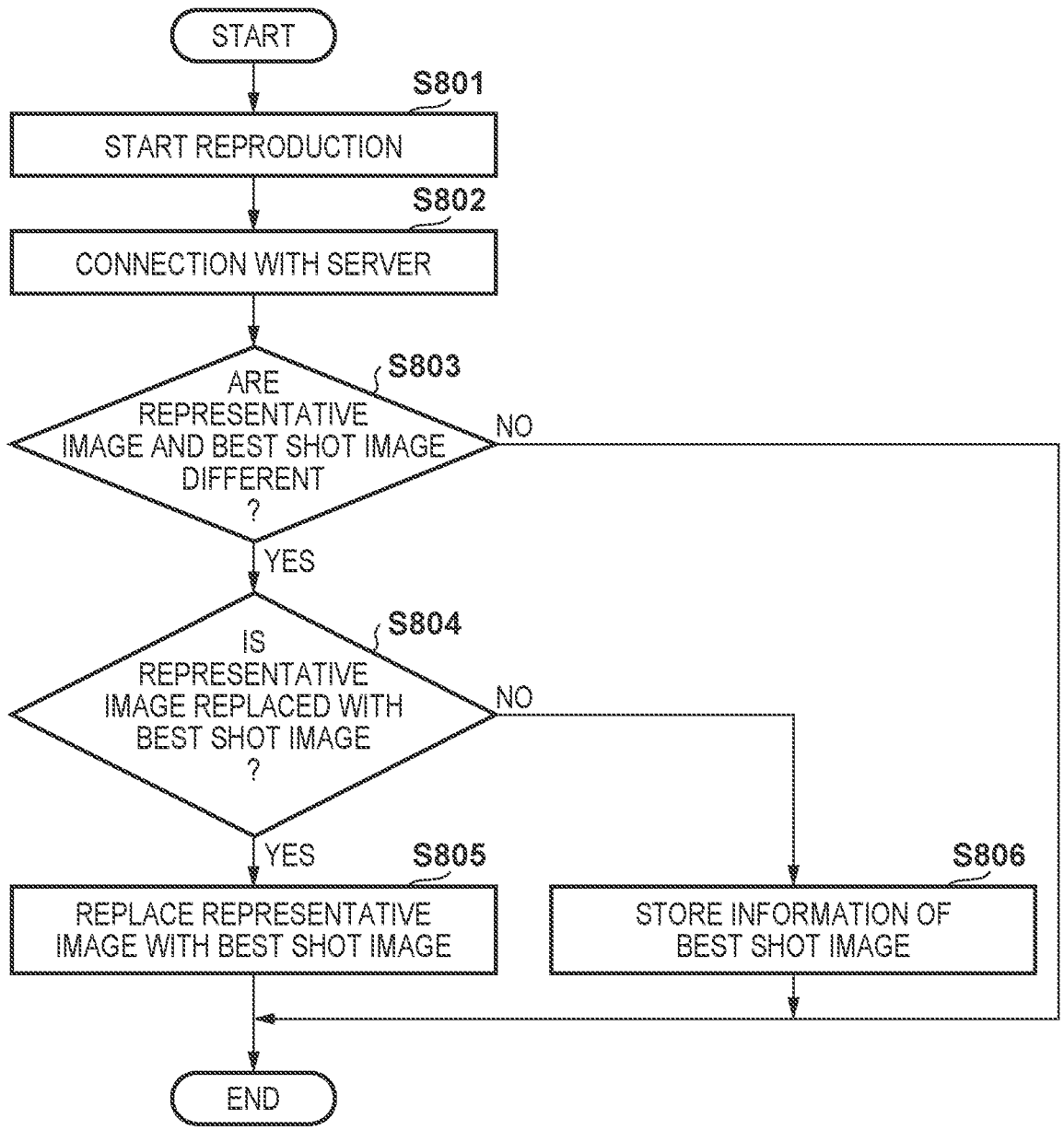

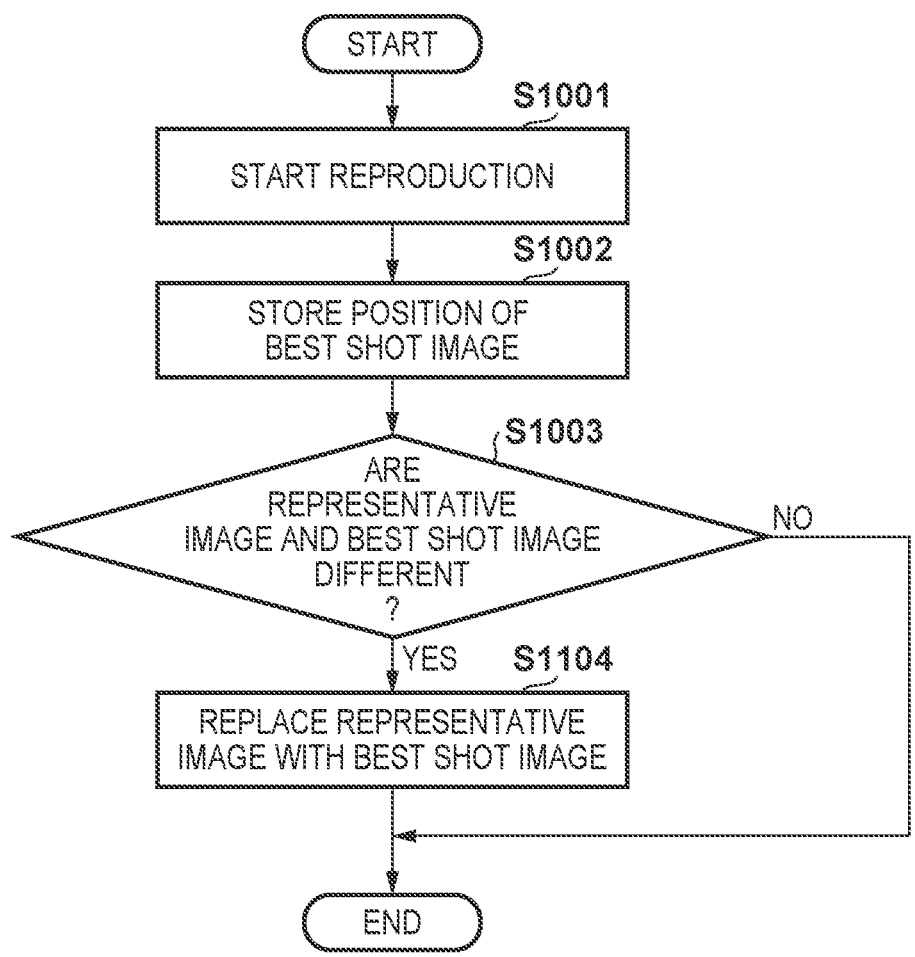

IMAGE CAPTURE APPARATUS AND CONTROL METHOD FOR RAW IMAGES

BACKGROUND

Technical Field

One disclosed aspect of the embodiments relates to a system for extracting and reproducing RAW images which satisfy predetermined conditions from among a plurality of RAW images.

Description of the Related Art

Due to the improvement in image sensor performance, the electronic shutter method, in which images are captured by controlling the timing of charge accumulation and reading by an image sensor, has become mainstream, replacing the mechanical shutter method, in which images are captured by mechanically actuating a shutter. Since the electronic shutter method, differing from the mechanical shutter method, does not generate any shutter sound during shooting, the electronic shutter method is suitable for a shooting scene in a quiet environment, for example. Furthermore, in the electronic shutter method, several tens of frames can be shot per second due to the improvement in the charge reading speed of image sensors.

In an image capture apparatus that can capture several tens of frames (for example, 30 frames) per second in such a manner, relatively time-consuming post-capture processing, such as compression processing and file creation processing, need to be omitted to transition to a state in which subsequent shooting can be performed. Thus, each one of the several tens of frames captured per second is recorded as RAW image data without development processing being performed thereon immediately after shooting. Furthermore, since thumbnail data for displaying is necessary even in the case of RAW image data, thumbnail data provided with a data size smaller than that when the data was captured is embedded into each frame. In such a manner, the overall processing time required for shooting is saved.

Furthermore, while development processing of RAW image data is conventionally performed using image development applications in digital cameras and personal computers (PCs), development processing can now be performed by a cloud server via a network due to the recent improvement in communication environment. By performing development processing using the cloud server in such a manner, high-quality developed images can be realized while quickly incorporating new services and algorithms. Furthermore, the time required for development processing can be reduced by using a high-performance server.

Further, the high-performance server can determine whether an image is in focus, whether a composition is appropriate, and whether a person has a good facial expression if a subject is a person, and extract the best shot from a plurality of images at a higher speed than an operation by which a user selects a preferred scene on his or her own. Japanese Patent Laid Open No. 2006-197566 discloses a video reproduction system that extracts a plurality of representative images corresponding to a plurality of scenes from moving image files, displays the representative images in a list, and allows a representative image of the selected scene to be reproduced when a user selects a preferred scene.

In a system in which a user transmits a plurality of RAW image data captured by a user using an image capture apparatus to a cloud server, and the cloud server extracts the best shot from a plurality of RAW image data, the best shot image extracted by the cloud server from the plurality of RAW image data may be different from the representative image extracted from the RAW image data held by the image capture apparatus. In addition, as the image capture apparatus receives the best shot image extracted by the cloud server, the representative image extracted by the image capture apparatus may be replaced by the best shot image extracted by the cloud server that the user does not intend to be replaced and reproduced.

SUMMARY

One disclosed aspect of the embodiments has been made in consideration of the aforementioned problems, and realizes techniques that allows a user to select a desired image when an image that satisfies the predetermined conditions extracted externally and the representative image extracted by the imaging device are different.

In order to solve the aforementioned problems, an embodiment provides an image capture apparatus that communicates with an image processing apparatus. The image capture apparatus includes a processor and a memory coupled to the processor and storing instructions that, when executed by the processor, cause the processor to function as a transmission unit, a reception unit, and a determination unit. The transmission unit is configured to transmit a plurality of RAW images acquired by continuous shooting by an image capturing unit to the image processing apparatus. The reception unit is configured to receive an image in which a predetermined RAW image is developed or an extracted result of the predetermined RAW image from the image processing apparatus. The image processing apparatus extracts the predetermined RAW image that satisfies a predetermined condition from the plurality of RAW images received from the image capture apparatus. The determination unit is configured to, when a predetermined representative image among the plurality of RAW images acquired by the image capturing unit and a predetermined RAW image extracted by the image processing apparatus are different, determine whether to replace the predetermined representative image with the predetermined RAW image.

In order to solve the aforementioned problems, the disclosure provides a method of controlling an image capture apparatus that communicates with an image processing apparatus. The method includes transmitting a plurality of RAW images acquired by continuous shooting by the image capturing unit to the image processing apparatus and receiving an image in which a predetermined RAW image is developed or an extracted result of the predetermined RAW image from the image processing apparatus. The image processing apparatus extracts the predetermined RAW image that satisfies a predetermined condition from the plurality of RAW images received from the image capture apparatus. When a predetermined representative image among the plurality of RAW images acquired by the image capturing unit and a predetermined RAW image extracted by the image processing apparatus are different, the method further includes determining whether to replace the predetermined representative image with the predetermined RAW image.

In order to solve the aforementioned problems, the disclosure provides a non-transitory computer-readable storage medium storing a program for causing a processor to execute a method of controlling an image capture apparatus that communicates with an image processing apparatus. The method includes transmitting a plurality of RAW images acquired by continuous shooting by the image capturing unit to the image processing apparatus and receiving an image in which a predetermined RAW image is developed or an extracted result of the predetermined RAW image from the image processing apparatus. The image processing apparatus extracts the predetermined RAW image that satisfies a predetermined condition from the plurality of RAW images received from the image capture apparatus When a predetermined representative image among the plurality of RAW images acquired by the image capturing unit and a predetermined RAW image extracted by the image processing apparatus are different, the method further includes determining whether to replace the predetermined representative image with the predetermined RAW image.

According to the disclosure, the user can select the desired image when the image that satisfies the predetermined conditions extracted externally and the representative image extracted by the image capture apparatus are different.

Further features of the disclosure will become apparent from the following description of exemplary embodiments (with reference to the attached drawings).

BRIEF DESCRIPTION OF THE DRAWINGS

FIG. 8 is a flowchart illustrating processing by the digital camera according to the present embodiment.

FIG. 10 is a flowchart illustrating processing of the digital camera when a user selects the best shot image.

DESCRIPTION OF THE EMBODIMENTS

Figure 1:
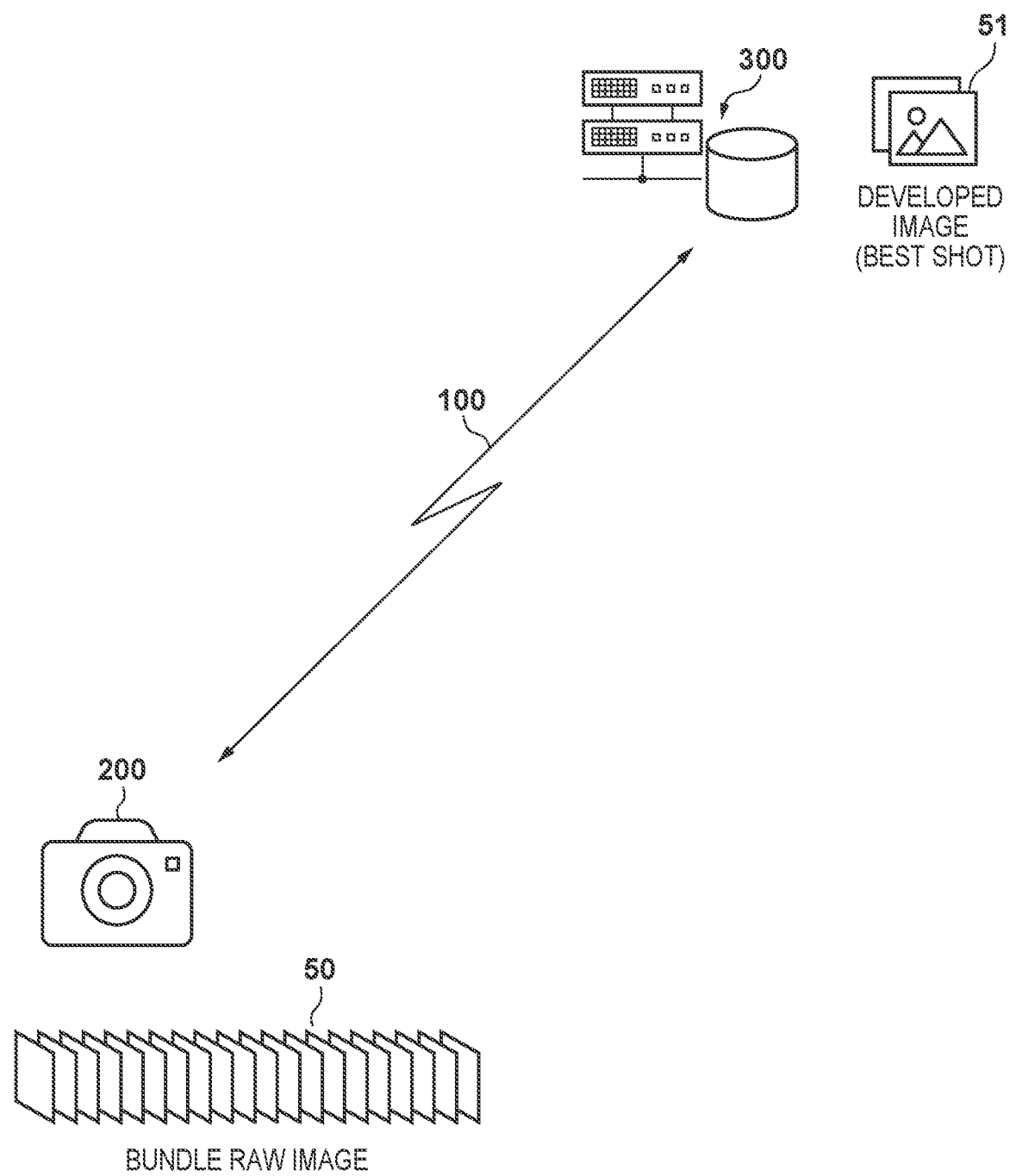
FIG. 1 is a system configuration diagram according to a present embodiment.

An exemplary embodiment of the disclosure will be described in detail below with reference to the accompanying drawings. It is to be noted that the following exemplary embodiment is merely one example for implementing the disclosure and can be appropriately modified or changed depending on individual constructions and various conditions of apparatuses to which the disclosure is applied. Thus, the disclosure is in no way limited to the following exemplary embodiment. Multiple features are described in the embodiments, but limitation is not made an embodiment that requires all such features, and multiple such features may be combined as appropriate. Furthermore, in the attached drawings, the same reference numerals are given to the same or similar configurations, and redundant description thereof is omitted. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" refers to any combination of the software and hardware contexts as described above.

In the present embodiment, an example of a system in which a server computer 300 and a digital camera (hereinafter "camera") 200 serving as an image generating apparatus and an image processing apparatus are connected by a communication network 100 will be described.

Note that, in the system according to the present embodiment, development processing of RAW image data generated by the camera 200 is executed by a cloud server (hereinafter "server") 300 that is present on the network and provides a development processing function. Note that, while an example in which the server 300 executes development processing of RAW image data will be described in the present embodiment, image processing other than development processing may be performed in the server 300.

<System Configuration>

First, a system configuration according to the present embodiment will be described with reference to FIG. 1.

The camera 200 has installed therein an image processing application for utilizing the development processing function of the server 300. The camera 200 is communicatively connected to the server 300 via the communication network 100, which is a wide area network (WAN), the Internet, a public network, or the like.

The camera 200 generates a bundle RAW image file 50 that is formed from a plurality of pieces of RAW image data generated by continuously shooting images by performing continuous shooting (RAW burst shooting), and transmits the bundle RAW image file 50 to the server 300. RAW image data generated by the camera 200 is image data such as a still image or a moving image shot by the digital camera, etc., and is image data that is made into a file without performing development processing thereon.

The camera 200 transmits RAW image data generated by the camera 200 to the server 300, and the server 300 executes development processing on the RAW image data received from the camera 200 and transmits developed image data to the camera 200.

From the plurality of pieces of RAW image data received from the camera 200, the server 300 extracts RAW image data determined as the best shot. Furthermore, the server 300 transmits, to the camera 200, information relating to the RAW image data determined as the best shot or developed image data 51 of the RAW image data determined as the best shot.

<Configuration of Camera 200>

Figure 2:
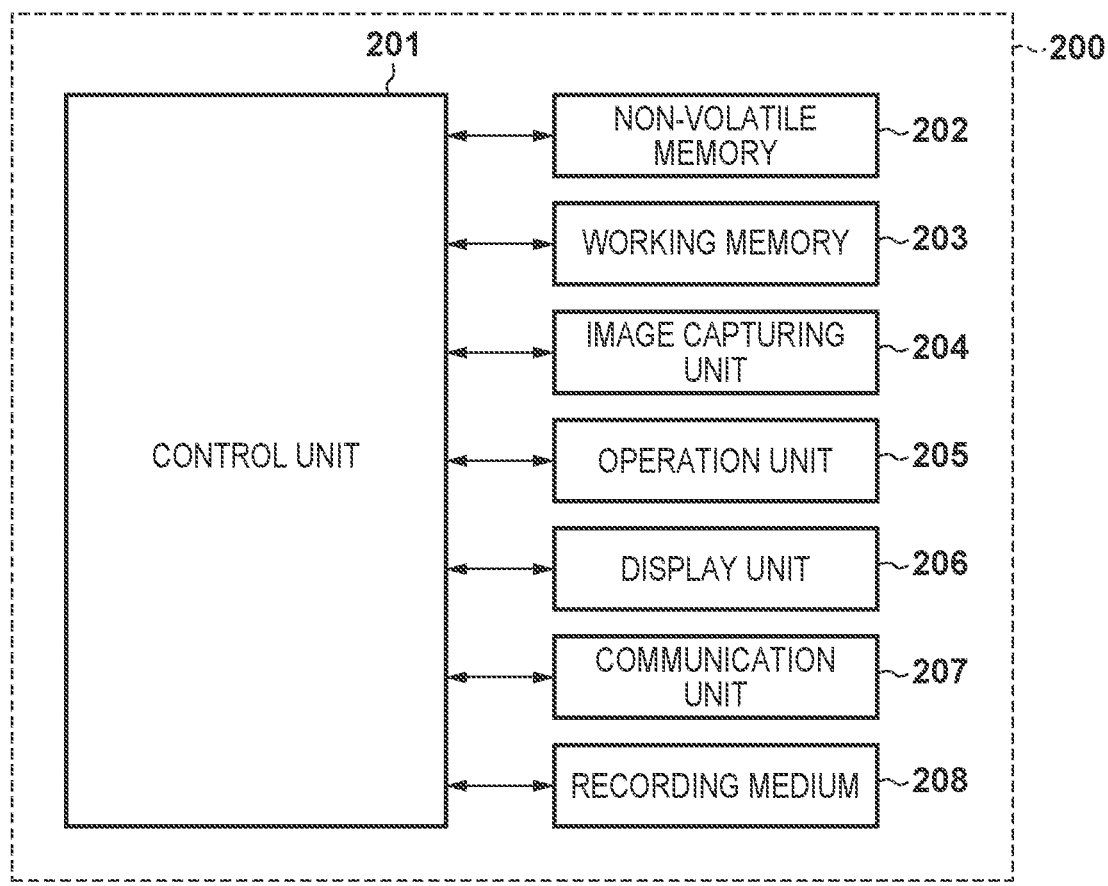
FIG. 2 is a block diagram illustrating a configuration of a digital camera according to the present embodiment.

Next, a hardware configuration of the camera 200 will be described with reference to FIG. 2.

Note that, while an example in which an image generation apparatus is applied to an image capture apparatus such as a digital camera will be described in the present embodiment, the disclosure is not limited to this. For example, the image generation apparatus may be an information processing apparatus such as a smartphone, which is a type of mobile telephones, a tablet device, a watch-type terminal, or a spectacle-type terminal.

A control unit 201 is an arithmetic processor implemented in a CPU that collectively controls the entire camera 200, and realizes processing in a flowchart which will be described later by executing programs stored a non-volatile memory 202 which will be described later. Note that the entire apparatus may be controlled by processing being shared among a plurality of pieces of hardware, rather than the control unit 201 controlling the entire apparatus.

The non-volatile memory 202 has stored therein constants for the operation of the control unit 201, programs, etc. The programs here include a program for executing communication processing with the server 300 which will be described later in the present embodiment. Furthermore, the non-volatile memory 202 has stored therein an operating system (OS), which is the basic software that the control unit 201 executes, and the image processing application, which realizes applied functions in cooperation with the OS. The processing by the camera 200 according to the present embodiment is realized by loading software provided by the image processing application. Note that the image processing application includes software for utilizing the basic functions of the OS installed in the camera 200. Note that the OS of the camera 200 may include software for realizing the processing according to the present embodiment. For example, the non-volatile memory 202 is an electrically erasable programmable read only memory (EEPROM).

A working memory 203 is used as a work area for loading constants and variables for the operation of the control unit 201, programs read from the non-volatile memory 202, etc. Furthermore, the working memory 203 is used as a buffer memory for temporarily holding image data captured by an image capturing unit 204, and as an image display memory for a display unit 206.

The image capturing unit 204 includes a lens group including a zoom lens and a focus lens, and a shutter provided with an aperture function. Furthermore, the image capturing unit 204 includes an image sensor that is constituted by a Charged Coupled Device (CCD), a Complementary Metal Oxide Semiconductor (CMOS) element, or the like that converts a subject image into electric signals, and an Analog-to-Digital (A/D) converter that converts analog image signals output from the image sensor into digital signals. By being controlled by the control unit 201, the image capturing unit 204 converts subject image light imaged by the lenses included in the image capturing unit 204 into electric signals using the image sensor, performs noise reduction processing, etc., and outputs image data constituted by digital signals.

The control unit 201 performs various types of image processing other than development processing on RAW image data captured by the image capturing unit 204, generates an image file, and records the image file to a recording medium 208. In the camera 200 according to the present embodiment, RAW image data is recorded to the recording medium 208 in accordance with the Design rule for Camera File system (DCF) specification. Furthermore, the control unit 201 performs automatic focus (AF) processing and automatic exposure (AE) processing by performing predetermined arithmetic processing using captured image data, and controlling the focus lens, aperture, and shutter of the image capturing unit 204 based on the arithmetic results that are obtained.

An operation unit 205 is constituted by operation members such as various switches, buttons, a touch panel, etc., for receiving various operations from a user. For example, the operation unit 205 includes a power button for turning the power on and off, a shutter button for shooting images, a mode setting button for setting the operation mode of the camera 200, etc. Furthermore, a touch panel that is integrally formed with the later-described display unit 206 is also included in the operation unit 205. In addition, the operation unit 205 includes an operation member such as a dedicated connection button for starting communication with an external device via the later-described communication unit 207. Furthermore, the operation unit 205 may be integrated with the camera 200, or may be an external device connected to the camera 200. It suffices for the camera 200 to be capable of being connected to the operation unit 205.

The shutter button is switched to ON when operated halfway, or that is, when a so-called "half-pressed" (shooting preparation instruction) is performed, as an operation performed by the user during image shooting, and generates a first shutter switch signal SW1. In response to the first shutter switch signal SW1 being switched to ON, the control unit 201 controls the image capturing unit 204 and thereby starts shooting preparation operations such as automatic focus (AF) processing, automatic exposure (AE) processing, auto white balance (AWB) processing, and pre-flash processing. Furthermore, the shutter button is switched to ON when operated completely, or that is, when a so-called "full-pressed" (shooting start instruction) is performed, as an operation performed by the user during image shooting, and generates a second shutter switch signal SW2. The control unit 201 starts a series of shooting operations from the reading of signals from the image capturing unit 204 to the writing of image data to the recording medium 208 in response to the second shutter switch signal SW2 being switched to ON, and terminates the shooting operations in response to the second shutter switch signal SW2 being switched to OFF (shooting termination instruction).

Using the mode setting button, the operation mode of the camera 200 can be set to one of a plurality of operation modes including a shooting mode for shooting still images and moving images, a reproduction mode for reproducing images, and a RAW burst shooting mode which will be described later. Note that, in RAW burst shooting, pre-shooting "OFF" and pre-shooting "ON" which will be described later can be set as a setting at the time of shooting.

The display unit 206 displays image data (including a live view) captured by the image capturing unit 204, image data on which image processing has been executed by the server 300, etc. Furthermore, the display unit 206 performs character display, etc., for interactive operation, such as the display of a graphical user interface (GUI) of the image processing application. For example, the display unit 206 is a display device such as a liquid-crystal display, an organic electroluminescent (EL) display, or the like. The display unit 206 may be integrated with the camera 200, or may be an external device connected to the camera 200. It suffices for the camera 200 to be capable of being connected to the display unit 206 and to have a function of controlling the display by the display unit 206.

The communication unit 207 is an interface for connecting to an external device such as the server 300. The camera 200 according to the present embodiment can exchange data with an external device via the communication unit 207. For example, RAW image data generated by the camera 200 can be transmitted to an external device via the communication unit 207. Note that, in the present embodiment, the communication unit 207 includes a Universal Serial Bus (USB) cable or a wired connection interface for High Definition Multimedia Interface (HDMI®) Institute of Electrical and Electronics Engineers (IEEE) 1394, etc. Furthermore, the communication unit 207 includes a wireless connection interface for a wireless local area network (LAN) based on the IEEE 802.11 specification, Bluetooth® based on the IEEE 802.15 specification, etc. The control unit 201 realizes communication with an external device by controlling the communication unit 207.

Image data output from the image capturing unit 204 is written to the recording medium 208, and image files that are already recorded are read from the recording medium 208. The recording medium 208 may be a memory card, a hard disk drive, or the like that is attached to the camera 200, or may be a flash memory or a hard disk drive that is built into the camera 200. It suffices for the camera 200 to have a function of accessing the recording medium 208, at the least.

<Configuration of Server 300>

Figure 3:
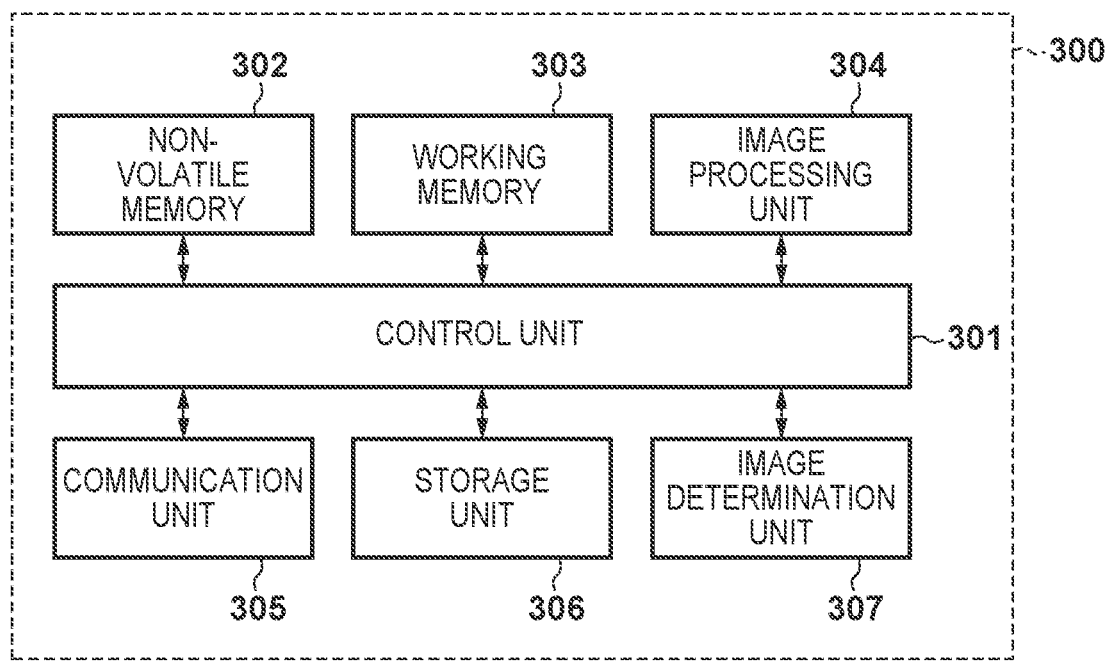
FIG. 3 is a block diagram illustrating a configuration of a server according to the present embodiment.

Next, a hardware configuration of the server 300 will be described with reference to FIG. 3.

The server 300 according to the present embodiment includes a control unit 301, a non-volatile memory 302, a working memory 303, an image processing unit 304, a communication unit 305, a storage unit 306, and an image determination unit 307.

The control unit 301 is an arithmetic processor implemented in a CPU that collectively controls the entire server 300, and realizes processing of a flowchart which will be described later by executing programs stored in the non-volatile memory 302 which will be described later. Note that the entire apparatus may be controlled by processing being shared among a plurality of pieces of hardware, rather than the control unit 301 controlling the entire apparatus.

The non-volatile memory 302 has stored therein constants for the operation of the control unit 301, programs, etc. The programs here include a program for executing communication processing with the camera 200. Furthermore, the non-volatile memory 302 has stored therein an operating system (OS), which is the basic software that the control unit 301 executes, and an image processing program which realizes applied functions in cooperation with the OS. The processing by the server 300 according to the present embodiment is realized by loading software provided by the image processing program. Note that the image processing program includes software for utilizing the basic functions of the OS installed in the server 300. Note that the OS of the server 300 may include software for realizing the processing according to the present embodiment. For example, the non-volatile memory 302 is a hard disk drive (HDD), a solid-state drive (SSD) constituted by a flash memory, an EEPROM, a flash memory, an optical disk, or the like.

The working memory 303 is used as a work area for loading constants and variables for the operation of the control unit 301, programs read from the non-volatile memory 302, etc. Furthermore, the working memory 303 is used as a buffer memory for temporarily holding RAW image data received from the camera 200.

The image processing unit 304 is a graphics processing unit (GPU) that generates developed image data obtained by applying development processing such as pixel interpolation processing, luminance signal processing, and color signal processing to RAW image data received from the camera 200.

The communication unit 305 includes software and circuitry for communicating with an external device by Hypertext Transfer Protocol (HTTP) communication, etc. The server 300 according to the present embodiment can exchange data with the camera 200 via the communication unit 305. For example, the server 300 can transmit developed image data developed by the image processing unit 304 to an external device via the communication unit 305. Note that, in the present embodiment, the communication unit 305 includes an interface for performing communication with an external device in a wireless method or a wired method. The control unit 301 realizes communication with an external device by controlling the communication unit 305. In the present embodiment, the communication unit 305 can connect to the camera 200 using the GET/HEAD methods. Note that the method for connection is not limited to the GET/HEAD methods, and methods such as the POST method or the PUT method may be used. The camera 200 and the server 300 may be connected using a public network, Wi-Fi®, or the like when the user performs the connection from outside his/her house, and may be connected via a home access point or the like when the user returns home. Note that the connection with the camera 200 is not limited to this, and the server 300 need not transmit developed image data to the camera 200.

The storage unit 306 is a storage device such as an SSD or a hard disk that stores data including image data received from the camera 200. Note that the server 300 is not limited to communicating with the camera 200, and the server 300 may communicate with other communication devices.

The image determination unit 307 includes software and circuitry for determining the best shot from among RAW image data received from the camera 200 and stored in the storage unit 306, and extracting RAW image data determined as the best shot.

The image processing unit 304 performs development processing on RAW image data determined as the best shot by the image determination unit 307. The developed image data is transmitted to the camera 200 by the communication unit 305.

<Bundle RAW Image and Best-Shot Determination>

Figure 4A:
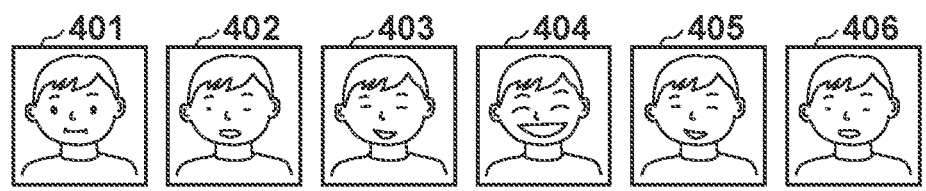
FIG. 4A is a diagram illustrating a bundle RAW image file and best-shot determination according to the present embodiment.

FIG. 4A is a diagram illustrating a method for extracting an image determined as the best shot from among a plurality of pieces of RAW image data.

In the present embodiment, the best shot is RAW image data determined as being the most suitable among a plurality of RAW images generated by continuously shooting the same subject in response to a predetermined shooting operation by performing RAW burst shooting. There are a plurality of determination conditions for the best shot, such as whether a subject is in focus, whether a subject is captured at a large size and whether a decisive moment is captured. In the present embodiment, a case in which a plurality of (for example, six) images 401 to 406 were shot by continuously shooting one person will be described with reference to FIG.

4A. In this case, the person is smiling the most in image 404, and image 404 is determined as the best shot among images 401 to 406.

Figure 4B:
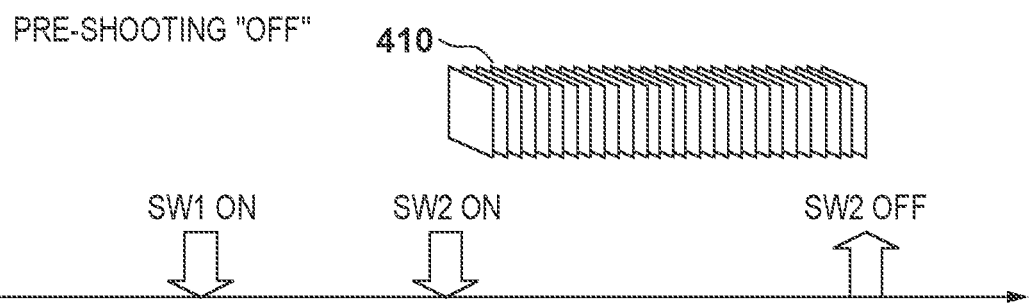
FIG. 4B is a diagram illustrating RAW burst shooting in a case in which pre-shooting is "OFF" according to the present embodiment.
Figure 4C:
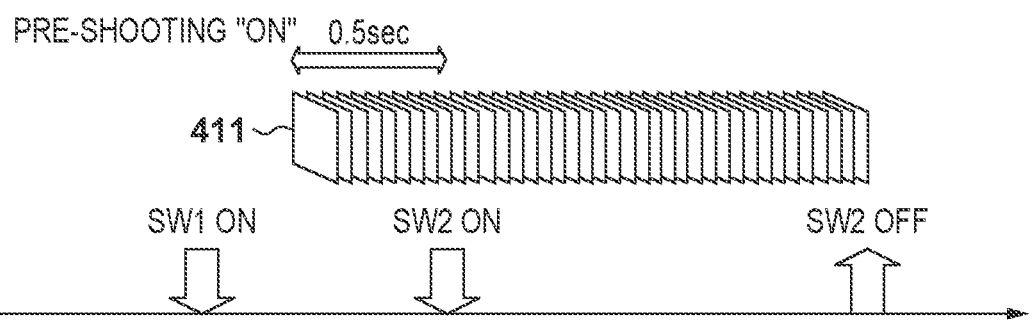
FIG. 4C is a diagram illustrating RAW burst shooting in a case in which pre-shooting is "ON" according to the present embodiment.

FIGS. 4B and 4C are diagrams illustrating RAW burst shooting.

RAW burst shooting is a method for continuously shooting a plurality of pieces of RAW image data, and pre-shooting "OFF" and pre-shooting "ON" can be set as a predetermined shooting setting. FIG. 4B illustrates an example of shooting operations in a case in which pre-shooting is "OFF", and FIG. 4C illustrates an example of shooting operations in a case in which pre-shooting is "ON". In FIGS. 4B and 4C, the horizontal axis indicates time.

In the pre-shooting "OFF" state in FIG. 4B, continuous shooting is performed from when the second shutter switch signal SW2 is switched to ON (start of shooting) until the second shutter switch signal SW2 is switched to OFF (termination of shooting), and the plurality of pieces of continuously shot RAW image data are recorded as one bundle RAW image file 410.

In the pre-shooting "ON" state in FIG. 4C, continuous shooting is performed until the second shutter switch signal SW2 is switched to OFF from a time point that is later than the time point when the first shutter switch signal SW1 is switched to ON and that is earlier by a predetermined amount of time than the time point when the second shutter switch signal SW2 is switched to ON, and the plurality of pieces of continuously shot RAW image data are recorded as one bundle RAW image file 411. In this case, RAW image data, which are continuously shot during a period until the second shutter switch signal SW2 is switched to OFF from a time that is earlier by the predetermined amount of time (0.5 seconds at maximum) than the time point when the second shutter switch signal SW2 is switched to ON, are recorded.

Figure 4D:
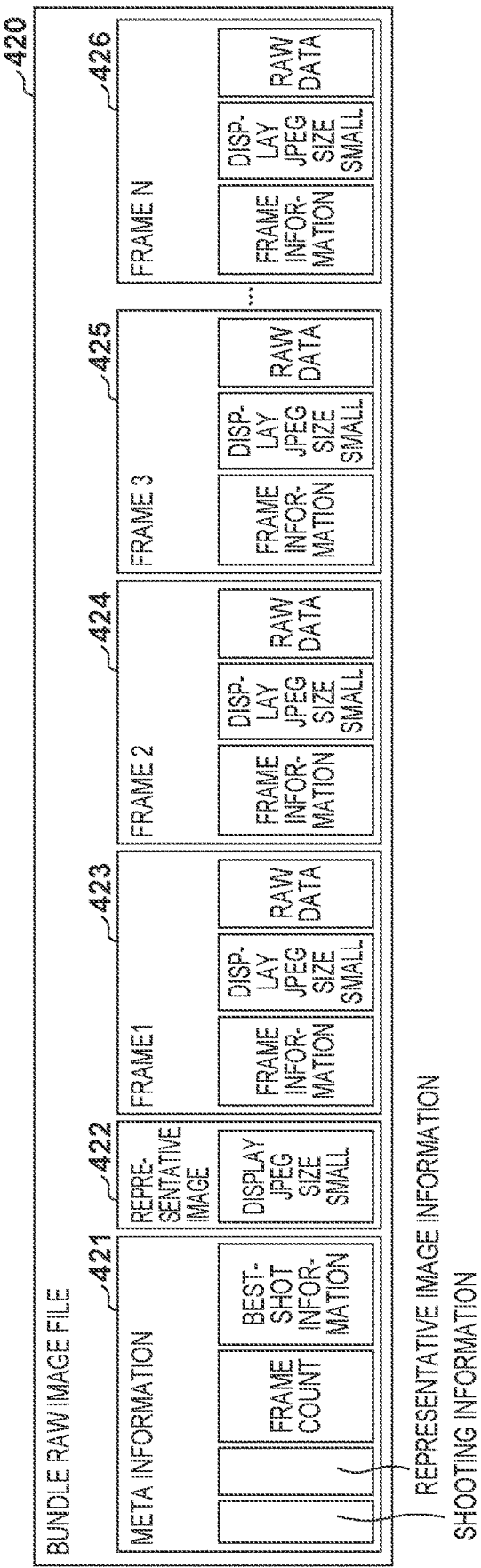
FIG. 4D is a data configuration diagram of a bundle RAW image file according to the present embodiment.

FIG. 4D is a diagram illustrating an example of a data configuration of a bundle RAW image file generated by performing RAW burst shooting.

A bundle RAW image file 420 includes meta information 421, a representative image 422, and image frames 423 to 426.

The meta information 421 includes shooting information, representative image information, a frame count, and best-shot information.

The representative image information is information including the frame number and the shooting date/time of RAW image data corresponding to a representative image 422 which will be described later, the resolution of the representative image, etc. The frame count is the number of pieces of RAW image data. The best-shot information is information about a frame determined as the best shot. In the present embodiment, the image determination unit 307 of the server 300 determines the best shot, and the determination result is transmitted to the camera 200 via the communication unit 305 of the server 300. However, the disclosure is not limited to this, and the best shot may be determined by the user himself/herself or may be automatically determined by the camera 200.

The representative image 422 includes display Joint Photographic Experts Group (JPEG) data of a representative image representing the entire bundle RAW image file. For example, a display image of a frame shot when the second shutter switch signal SW2 is switched to ON in FIGS. 4B and 4C is recorded as the representative image and is used as an image that is displayed on a selection screen and a reproduction screen which will be described later in FIGS. 5A and 5B.

The image frames 423 to 426 are the plurality of pieces of RAW image data included in the bundle RAW image file 420. The image frame 423 includes frame information of the first frame, a display JPEG (size: small), and RAW data. The image frame 424 includes frame information of the second frame, a display JPEG (size: small), and RAW data. The image frame 425 includes frame information of the third frame, a display JPEG (size small), and RAW data. The image frame 426 includes frame information of the final frame N, a display JPEG (size: small), and RAW data.

By performing RAW burst shooting using the camera 200, one bundle RAW image file 420, which is a bundle of continuously shot RAW image data, is generated. The server 300 can acquire a best-shot image by extracting one piece of RAW image data determined as being the best shot from the bundle RAW image file 420 received from the camera 200.

Figure 5A:
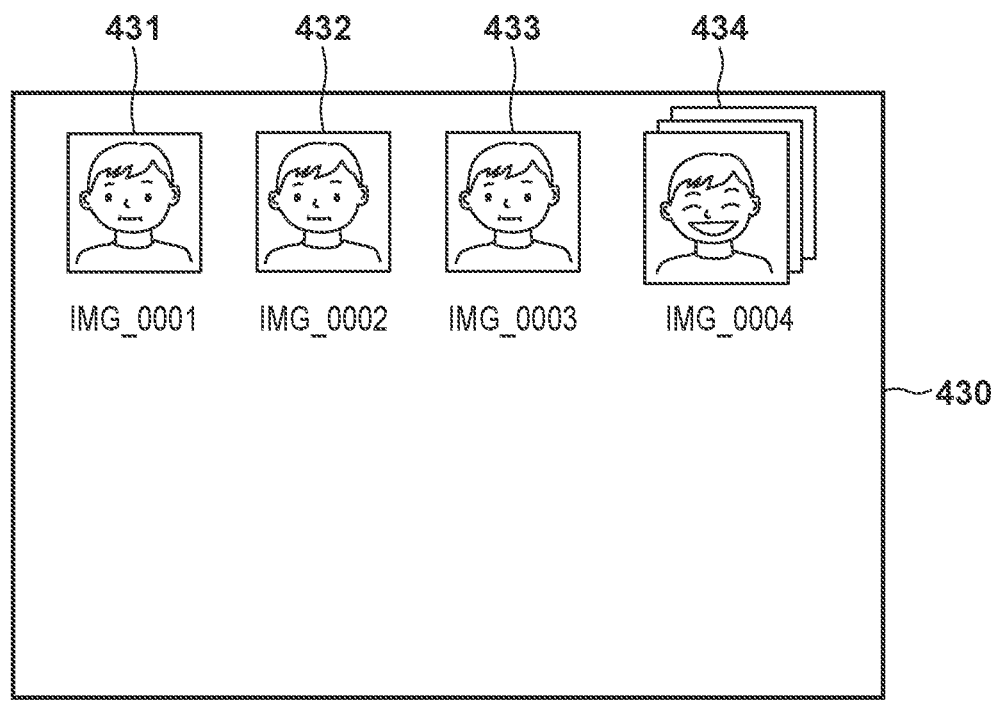
FIGS. 5A and 5B illustrate examples of screens in which a plurality of image files held in the digital camera of the present embodiment are displayed in a list.
Figure 5B:
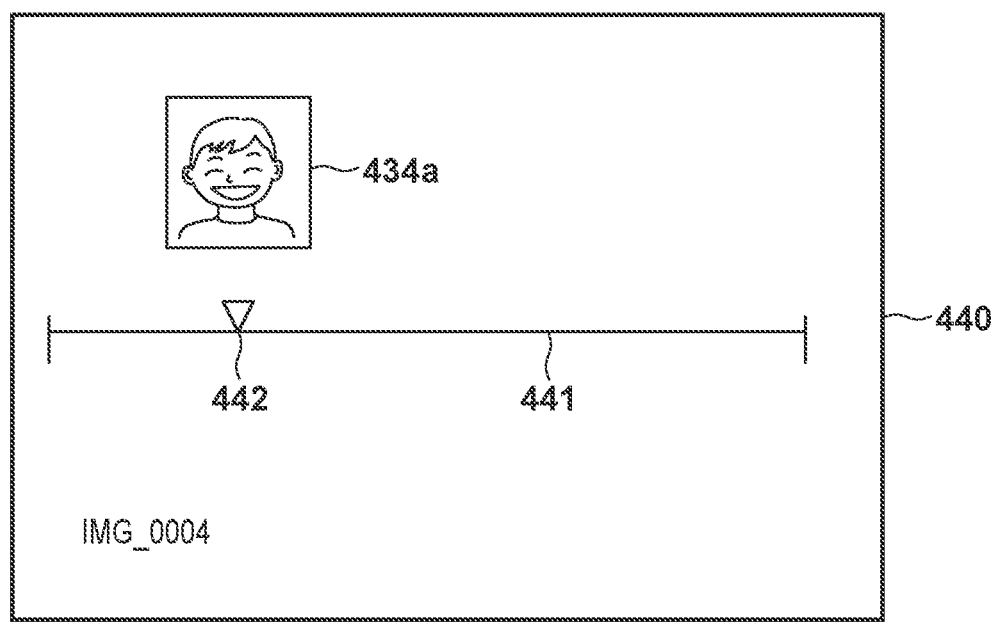

FIGS. 5A and 5B illustrate examples of screens in which a plurality of image files held in the digital camera of the present embodiment are displayed in a list.

Hereinafter, examples of screens in which a plurality of image files stored in the recording medium 208 are displayed in a list on a selection screen 430 that is displayed on the display unit 206 of the camera 200 will be described.

The selection screen 430 of FIG. 5A displays a state in which four image files 431 to 434 are stored in the recording medium 208. The image files 431, 432 and 433 are JPEG files, and the image file 434 is a bundle RAW image file. The thumbnail attached to meta-information is displayed for a JPEG file. The display JPEG (size: small) held in a representative image 422 is displayed for the bundle RAW image file.

When the bundle RAW image file 434 is selected as a reproduction target on the selection screen 430 of FIG. 5A, the reproduction screen 440 shown in FIG. 5B is displayed on the display unit 206. A representative image 434a extracted from the bundle RAW image file 434 and a slider bar 441 are displayed on the reproduction screen 440. A length of the slider bar 441 corresponds to a length in a case where the plurality of RAW image data included in the bundle RAW image file 434 are arranged in time series. The representative image 434a is displayed at a position corresponding to the mark 442 of the slider bar 441, and the user can check images before and after the representative image 434a or change the representative image by sliding the mark 442 on the slider bar 441.

<Processing of Server 300>

Next, best-shot extraction processing and development processing executed by the server 300 will be described with reference to FIG. 6.

Figure 6:
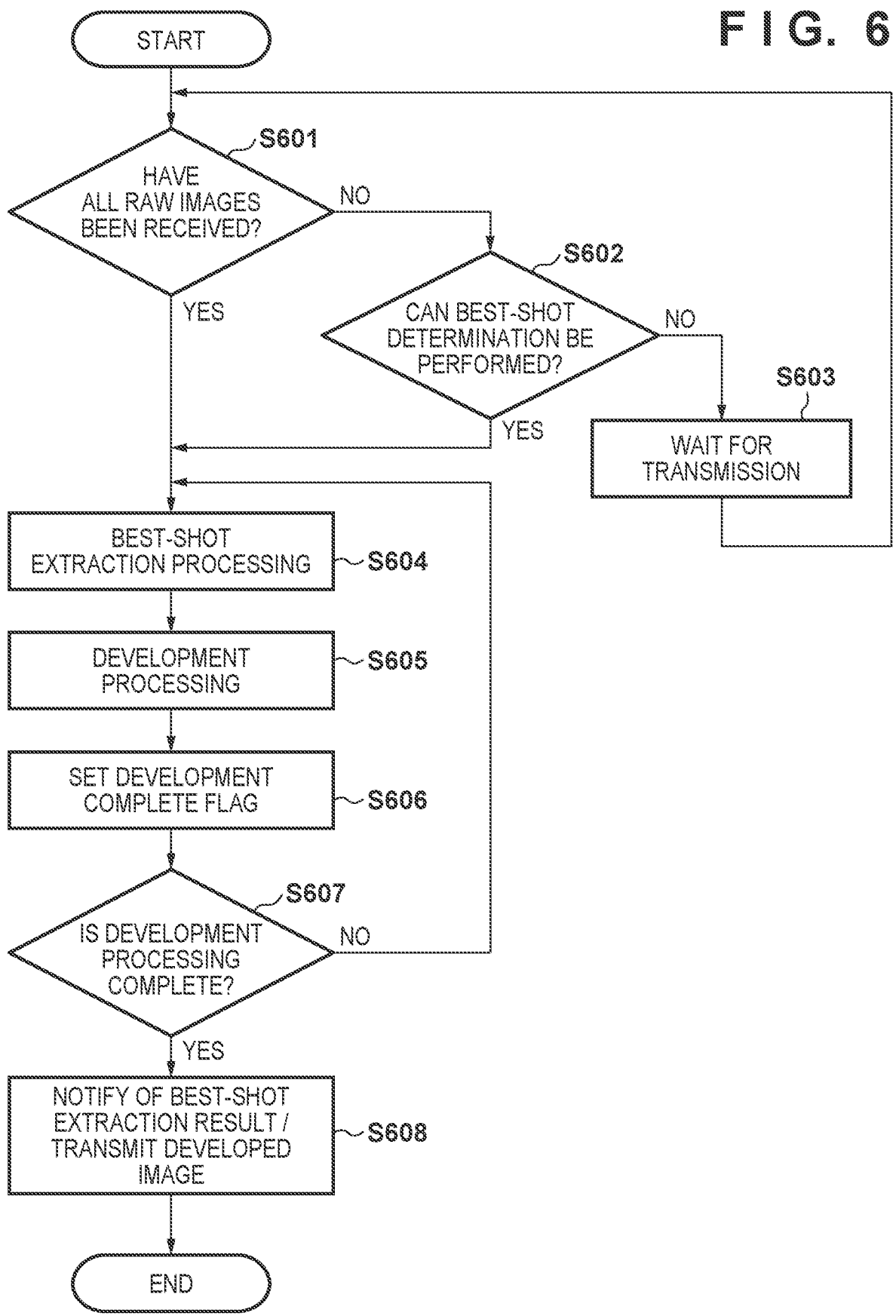
FIG. 6 is a flowchart illustrating processing by the server according to the present embodiment.

Note that the processing in FIG. 6 is realized by the control unit 301 of the server 300 controlling each component of the server 300 by loading and executing, in the working memory 303, programs stored in the non-volatile memory 302. Furthermore, the processing in FIG. 6 is started when the server 300 receives a bundle RAW image file from the camera 200.

In step S601, the control unit 301 determines whether or not all pieces of RAW image data included in the bundle RAW image file transmitted from the camera 200 have been received. The control unit 301 proceeds the processing to step S604 when the control unit 301 determines that all pieces of RAW image data have been received, and proceeds the processing to step S602 when the control unit 301 determines that all pieces of RAW image data have not been received. The control unit 301 determines whether or not all pieces of RAW image data have been received by referring to the frame count in the meta information 421 in the received bundle RAW image file 420.

In step S602, the control unit 301 determines whether or not the best-shot determination can be performed using the subset of RAW image data that has been received from the camera 200. The control unit 301 proceeds the processing to step S604 when the control unit 301 determines that the best-shot determination can be performed, and proceeds the processing to step S603 when the control unit 301 determines that the best-shot determination cannot be performed. For example, the control unit 301 determines whether or not the best shot can be determined by determining whether or not a plurality of pieces or more of RAW image data have been received, or whether or not a tendency of the subject can be determined from the received RAW image data. Furthermore, the control unit 301 determines whether or not the best shot can be determined, such as a case where the control unit 301 determines that no more RAW image data is required for determining the best shot, by determining whether or not the best shot can be extracted from the subset of RAW image data of the bundled RAW image file.

In step S603, the control unit 301 waits until the rest of the RAW image data is transmitted from the camera 200, and returns the processing to step S601.

In step S604, the control unit 301 performs the best-shot determination using the image determination unit 307, and proceeds the processing to step S605. A plurality of conditions, such as whether a subject is in focus, whether a subject is captured at a large size, and whether a decisive moment is captured, are used in the best-shot determination, and the best-shot determination can be performed by changing and combining conditions based on subject recognition results. Note that the method for the best-shot determination is not limited to this, and any method may be used. For example, various algorithms may be combined using artificial intelligence (AI), or user's shooting tendency may be learned and reflected in the best-shot determination.

In step S605, the control unit 301 causes the image processing unit 304 to perform development processing on RAW image data determined as the best shot, and proceeds the processing to step S606. Note that the parameters of the development processing executed by the image processing unit 304 can be set by the user as desired, or can be automatically set by the server 300 using AI. Furthermore, the RAW image data can also be retained as-is without performing development processing.

In step S606, the control unit 301 sets a development-complete flag indicating a state that the development processing has been completed on the RAW image data on which development processing has been performed in step S605, and proceeds the processing to step S607. Note that the development-complete flag may be stored in a dedicated storage area in the working memory 303 or the non-volatile memory 302.

In step S607, the control unit 301 determines whether or not the development processing has been completed. The control unit 301 proceeds the processing to step S608 when the control unit 301 determines that development processing has been completed, and returns the processing to step S604 when the control unit 301 determines that development processing has not been completed. The control unit 301 determines whether or not the development processing has been completed by determining, based on a setting of the upper limit of the number of pieces of RAW image data to be determined as the best shot and developed from one bundle RAW image file, whether or not the development of the set number of pieces of RAW image data have been completed. The upper limit of the number of pieces of RAW image data to be determined as the best shot and developed may be set in advance to the server 300, and it suffices when the upper limit of the number of pieces of RAW image data to be determined as the best shot and developed can be set to the server in some way.

In step S608, the control unit 301 notifies the camera 200 of the best-shot extraction result, transmits developed image data to the camera 200, and terminates processing. Note that the details of the processing in step S608 will be described later with reference to FIGS. 7A and 7B. In the notification of the best-shot extraction result from the server 300 to the camera 200, the server 300 may notify the camera 200 of only best-shot information such as the frame number(s) of RAW image data determined by the image determination unit 307 of the server 300. Alternatively, the server 300 may transmit developed image data obtained by developing RAW image data determined as the best shot, or may transmit both the best-shot information and the developed image data.

<Notification of Best-Shot Extraction Result>

Next, the processing in which the server 300 notifies the camera 200 of a best-shot extraction result will be described with reference to FIGS. 7A and 7B.

Figure 7A:
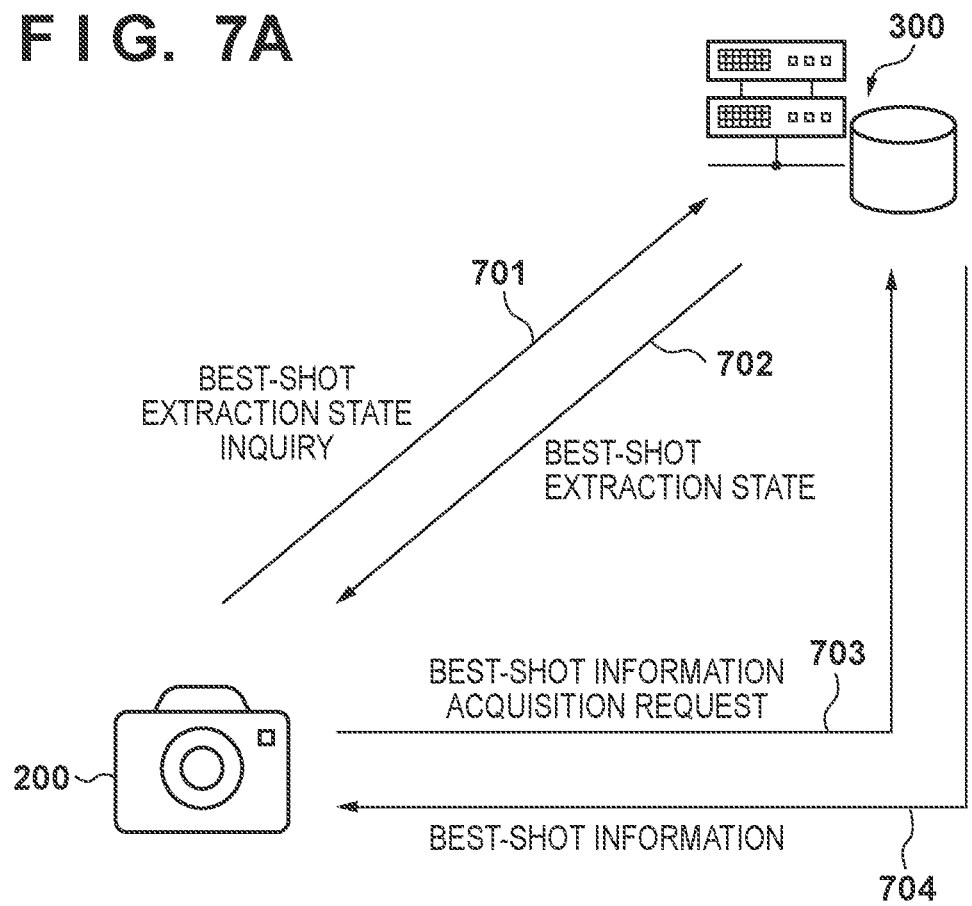
FIGS. 7A and 7B are diagrams illustrating notification processing for providing a notification of a best shot extraction result according to the present embodiment.

FIG. 7A is a diagram illustrating notification processing of a best-shot extraction result. The camera 200 makes an inquiry as to which frame in a bundle RAW image file that the camera 200 transmitted to the server 300 has been determined as the best shot by transmitting a best-shot extraction state inquiry 701 to the server 300. The transmission of the inquiry is triggered when image reproduction is performed on the camera 200, for example. When the camera 200 is connected to the server 300 at all times, there is no need to take the connection timing into consideration. However, in a case in which the camera 200 is not connected to the server 300, connection with the server 300 needs to be established when the best-shot extraction state inquiry 701 is to be made. When the server 300 receives the best-shot extraction state inquiry 701 from the camera 200, the server 300 transmits a best-shot extraction state 702 in the server 300 to the camera 200 as a response thereto.

Figure 7B:
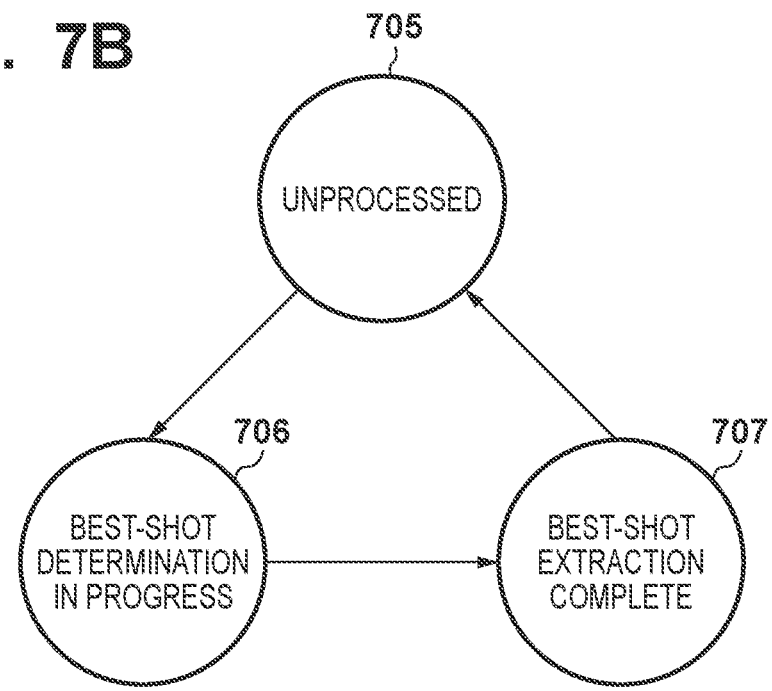

FIG. 7B is a diagram illustrating an example of the transition of the best-shot extraction state of the server 300. A state in which the server 300 has received a bundle RAW image file but has not started best-shot extraction processing yet is referred to as an "unprocessed" state 705. A state while best-shot extraction processing is in progress is referred to as a "best-shot determination in progress" state 706. A state in which best-shot extraction processing has completed is referred to as a "best-shot extraction complete" state 707. Note that, while three states are illustrated as examples in the example in FIGS. 7A and 7B, there may be other states.

When the best-shot extraction state 702 that is the response to the best-shot extraction state inquiry 701 is the "unprocessed" state 705 or the "best-shot determination in progress" state 706, the best-shot extraction state inquiry 701 is repeatedly transmitted to the server 300 until the best-shot extraction state 702 changes to the "best-shot extraction complete" state 707. When the camera 200 determines that the best-shot extraction state 702 of the server 300 has changed to the "best-shot extraction complete" state 707, the camera 200 transmits a best-shot information acquisition request 703 to the server 300 and makes an inquiry to the server 300 about the frame extracted as the best shot. As a response to the best-shot information acquisition request 703, the server 300 transmits best-shot information 704 such as the frame number of RAW image data determined as the best shot from the bundle RAW image file.

<Processing of the Camera 200>

Next, processing performed by the camera 200 will be described with reference to FIG. 8.

FIG. 8 is a flowchart illustrating the processing of the camera 200 when the best shot image extracted by the server 300 and the representative image extracted by the camera 200 are different.

The processing of FIG. 8 is realized by the control unit 201 of the camera 200 controlling each component of the camera 200 by loading and executing, in the working memory 203, programs stored in the non-volatile memory 202. Furthermore, the processing of FIG. 8 is started in response to the user selecting the bundle RAW image file 434 as the reproduction target on the selection screen 430 shown in FIG. 5A. It is also assumed in the processing of FIG. 8 that the server 300 has received bundle RAW images in advance from the camera 200 and is in the state of the best shot extraction completion 707 described in FIGS. 7A and 7B. This is the same in processing of FIG. 10 which will be described later as well.

In step S801, the control unit 201 starts processing of reading and reproducing bundle RAW image file from the recording medium 208. Here, when the camera 200 is not connected to the server 300, in step S802, the control unit 201 starts connection processing with the server 300.

In step S803, the control unit 201 compares the representative image of the bundle RAW image file for which the reproduction processing has been started in step S801 with the best shot image extracted by the server 300. Consequently, when the control unit 201 determines that the representative image of the bundle RAW image file for which the reproduction processing has been started in step S801 and the best shot image extracted by the server 300 are different, the control unit 201 proceeds the processing to step S804. Further, when the control unit 201 determines that the representative image of the bundle RAW image file for which the reproduction processing has been started in step S801 and the best shot image extracted by the server 300 are identical, the control unit 201 terminates processing.

In step S804, the control unit 201 determines whether to replace the representative image of the bundle RAW image file stored in the recording medium 208 with the best shot image extracted by the server 300. In this case, for example, by displaying a warning screen before starting the reproduction, it may be controlled to notify the user that there is a difference between the representative image of the bundle RAW image file stored in the camera 200 and the best shot image extracted by the server 300, and cause the user to select the replacement of the representative image.

When the control unit 201 determines in step S804 that the representative image of the bundle RAW image file stored in the recording medium 208 is to be replaced with the best shot image extracted by the server 300, the control unit 201 proceeds the processing to step S805, and when the control unit 201 determines that the representative image of the bundle RAW image file is not to be replaced, the control unit 201 proceeds the processing to step S806.

In step S805, the control unit 201 replaces the representative image of the bundle RAW image file stored in the recording medium 208 with the best shot image extracted by the server 300. In the replacement, the representative image information of the meta information 421 of the bundle RAW image file 420 described in the FIG. 4D is replaced with the frame number of the best shot image extracted by the server 300, and the display JPEG (size: small) of the representative image 422 is replaced with the best shot image extracted by the server 300.

In step S806, the control unit 201 records the frame number of the best shot image extracted by the server 300 in the best shot information in the meta information 421 of the bundle RAW image file 420.

Figure 9A:
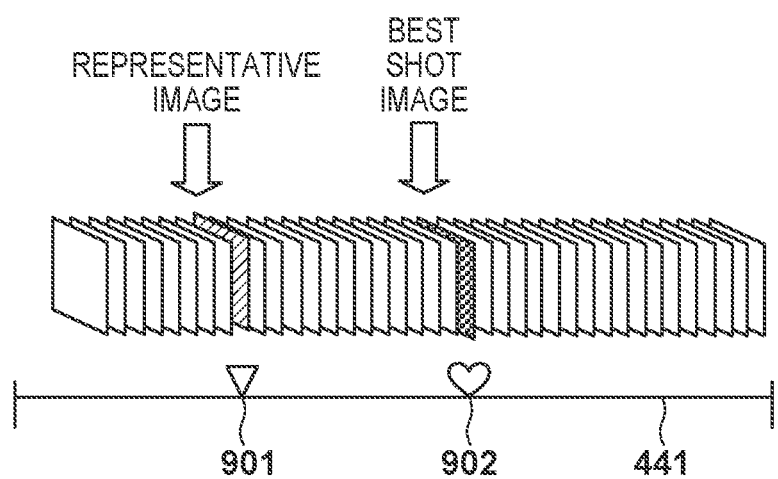
FIGS. 9A and 9B are diagrams illustrating processing during reproduction according to the present embodiment when a representative image and a best shot image are different.
Figure 9B:
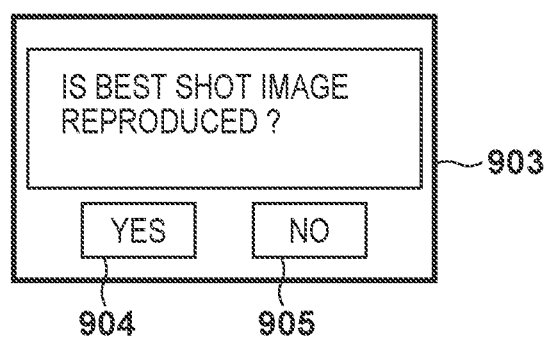

FIGS. 9A and 9B are diagrams illustrating processing during reproduction when the representative image of the bundle RAW image file stored in the camera 200 and the best shot image extracted by the server 300 are different.

When the representative image of the bundle RAW image file stored in the camera 200 and the best shot image extracted by the server 300 are identical, an image corresponding to the representative image of the bundle RAW image file stored in the camera 200 and at the position corresponding to the mark 901 of the slider bar 441 is displayed as shown in the FIG. 9A. On the other hand, when the representative image of the bundle RAW image file stored in the camera 200 and the best shot image extracted by the server 300 are different, if there is a difference between the representative image information and the best shot image information during reproduction, it is controlled to display a warning screen 903 on the display unit 206 as shown in the FIG. 9B, and cause the user to select whether or not the best shot image is displayed. When the user selects "YES" 904 on the warning screen 903, the best shot image at the position corresponding to the mark 902 of the slider bar 441 shown in FIG. 9A is displayed. Further, when the user selects "NO" 905 on the warning screen 903, the representative image at the position corresponding to the mark 901 of the slider bar 441 is displayed.

In such manner, when the representative image of the bundle RAW image file stored in the camera 200 and the best shot image extracted by the server 300 are different, the user can select either the representative image of the bundle RAW image file stored in the camera 200 or the best shot image extracted by the server 300 as the image to be reproduced, and can replace the representative image of the bundle RAW image file stored in the camera 200 with the best shot image extracted by the server 300, thereby the image desired by the user can be targeted to be displayed when the reproduction of the bundle RAW image file is started.

<Variation>

In the above described embodiment, an example has been described in which the server 300 extracts the best shot image from the bundle RAW image and notifies the digital camera 200 of the best shot information. However, the user is likely to perform the best shot determination without performing the best shot determination by the server 300. In this case, hereinafter, processing when the user selects the best shot image from the bundle RAW image file will be described.

FIG. 10 is a flowchart illustrating the processing of the camera 200 when the user selects the best shot image.

In step S1001, the control unit 201 starts the processing of reading and reproducing the bundle RAW image file from the recording medium 208.

In step S1002, the control unit 201 stores a position corresponding to the best shot image selected from the bundle RAW image file by the user moving the position of the marks 442 of the slider bar 441 on the reproduction screen 440 in FIG. 5B.

In step S1003, the control unit 201 compares the representative image of the bundle RAW image file which is selected and for which the reproduction processing is started in step S1002 with the best shot image extracted by the server 300. Consequently, when the control unit 201 determines that the representative image of the bundle RAW image file for which the reproduction processing is started in step S1002 and the best shot image extracted by the server 300 are different, the control unit 201 proceeds the processing to step S804. Further, when the control unit 201 determines that the representative image of the bundle RAW image file for which the reproduction processing is started in step S1002 and the best shot image extracted by the server 300 are identical, the control unit 201 terminates the processing.

In step S1003, the control unit 201 compares the representative image of the bundle RAW image file stored in the camera 200 with the best shot image selected by the user in step S1002. Consequently, when the control unit 201 determines that the representative image of the bundle RAW image file stored in the digital camera 200 and the best shot image selected in step S1002 are different, the control unit 201 proceeds the processing to step S1004, and when the control unit 201 determines that the representative image of the bundle RAW image stored in the digital camera 200 and the best shot image selected in step S1002 are identical, the control unit 201 terminates processing.

In step S1004, the control unit 201 replaces the representative image of the bundle RAW image file stored in the camera 200 with the best shot image selected in step S1002. The position of the mark on the slider bar 441 of the reproduction screen 440 is also changed from the position of the representative image of the bundle RAW image file stored in the camera 200 to the position of the best shot image selected by the user.

In such manner, when the user selects the best shot image without performing the best shot determination by the server 300, the representative image of the bundle RAW image file stored in the camera 200 is replaced with the best shot image selected by the user, and also the position of the mark is changed to the position on the slider bar 441 of the reproduction screen 440, thereby the image desired by the user can be immediately displayed as the display target at the time of starting the reproduction of the bundle RAW image file.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-095271, filed Jun. 7, 2021 which is hereby incorporated by reference herein in its entirety.

What is claimed is:

1. An image capture apparatus that communicates with an image processing apparatus, comprising:
  a processor and a memory coupled to the processor and storing instructions that, when executed by the processor, cause the processor to function as:
  a transmission unit configured to transmit a plurality of RAW images acquired by continuous shooting by an image capturing unit to the image processing apparatus;
  a reception unit configured to receive an image in which a predetermined RAW image is developed or an extracted result of the predetermined RAW image from the image processing apparatus, wherein the image processing apparatus extracts the predetermined RAW image that satisfies a predetermined condition from the plurality of RAW images received from the image capture apparatus; and
  a determination unit configured to, when a predetermined representative image among the plurality of RAW images acquired by the image capturing unit and a predetermined RAW image extracted by the image processing apparatus are different, determine whether to replace the predetermined representative image with the predetermined RAW image.

2. The apparatus according to claim 1, wherein when the predetermined representative image and the predetermined RAW image are different, the processor functions as a notification unit configured to notify a user of whether to replace the predetermined representative image with the predetermined RAW image.

3. The apparatus according to claim 1, wherein the processor functions as a reproduction unit configured to reproduce the plurality of RAW images, and
  when the predetermined representative image is replaced with the predetermined RAW image, the reproduction unit changes a position at which the reproduction of the image is started from the predetermined representative image to the predetermined RAW image.

4. The apparatus according to claim 1, further comprising a storage unit configured to store information relating to the predetermined RAW image when the predetermined representative image is not replaced with the predetermined RAW image.

5. The apparatus according to claim 1, wherein the predetermined RAW images is not a RAW image extracted by the image processing apparatus, but is a RAW image selected by a user from among the plurality of RAW images.

6. The apparatus according to claim 3, wherein the reproduction unit displays a position of the predetermined representative image and/or a position of the predetermined RAW image in the plurality of RAW images.

7. The apparatus according to claim 1, wherein the predetermined RAW images is an image of the best shot extracted by the image processing apparatus from among the plurality of RAW images received from the image capture apparatus.

8. A method of controlling an image capture apparatus that communicates with an image processing apparatus, the method comprising:

transmitting a plurality of RAW images acquired by continuous shooting by the image capturing unit to the image processing apparatus;

receiving an image in which a predetermined RAW image is developed or an extracted result of the predetermined RAW image from the image processing apparatus, wherein the image processing apparatus extracts the predetermined RAW image that satisfies a predetermined condition from the plurality of RAW images received from the image capture apparatus; and when a predetermined representative image among the plurality of RAW images acquired by the image capturing unit and a predetermined RAW image extracted by the image processing apparatus are different, determining whether to replace the predetermined representative image with the predetermined RAW image.

9. A non-transitory computer-readable storage medium storing a program for causing a processor to execute a method of controlling an image capture apparatus that communicates with an image processing apparatus, the method comprising:

transmitting a plurality of RAW images acquired by continuous shooting by the image capturing unit to the image processing apparatus;

receiving an image in which a predetermined RAW image is developed or an extracted result of the predetermined RAW image from the image processing apparatus, wherein the image processing apparatus extracts the predetermined RAW image that satisfies a predetermined condition from the plurality of RAW images received from the image capture apparatus; and when a predetermined representative image among the plurality of RAW images acquired by the image capturing unit and a predetermined RAW image extracted by the image processing apparatus are different, determining whether to replace the predetermined representative image with the predetermined RAW image.

* * * * *